United States Patent
Ragan et al.

(10) Patent No.: US 10,435,244 B2
(45) Date of Patent: Oct. 8, 2019

(54) CONVEYOR WITH POWERED POP-UP ROLLER

(71) Applicant: Laitram, L.L.C., Harahan, LA (US)

(72) Inventors: Bryant G. Ragan, Metairie, LA (US); Robert L. Rosen, New Orleans, LA (US); Jaime E. Castro Cuevas, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/767,040

(22) PCT Filed: Nov. 9, 2016

(86) PCT No.: PCT/US2016/061022
§ 371 (c)(1),
(2) Date: Apr. 9, 2018

(87) PCT Pub. No.: WO2017/083319
PCT Pub. Date: May 18, 2017

(65) Prior Publication Data
US 2018/0305127 A1   Oct. 25, 2018

Related U.S. Application Data

(60) Provisional application No. 62/252,667, filed on Nov. 9, 2015.

(51) Int. Cl.
| | | |
|---|---|---|
| *B65G 13/071* | (2006.01) |
| *B65G 39/12* | (2006.01) |
| *B65G 13/06* | (2006.01) |
| *B65G 13/11* | (2006.01) |
| *H02K 7/14* | (2006.01) |
| *B65G 47/52* | (2006.01) |
| *H02K 7/116* | (2006.01) |

(52) U.S. Cl.
CPC .......... *B65G 13/071* (2013.01); *B65G 13/06* (2013.01); *B65G 13/11* (2013.01); *B65G 39/12* (2013.01); *B65G 47/52* (2013.01); *H02K 7/14* (2013.01); *H02K 7/116* (2013.01)

(58) Field of Classification Search
USPC .................. 198/780–791, 805, 832, 834, 835
See application file for complete search history.

(56) References Cited

U.S. PATENT DOCUMENTS 2,624,444 A * 1/1953 Casabona .............. B65G 47/66
                                                        198/560
2,812,051 A   11/1957 Duckro
(Continued)

FOREIGN PATENT DOCUMENTS

GB        1000623 A        8/1965

OTHER PUBLICATIONS

Supplementary Partial European Search Report of European Patent Application No. 16864874, dated May 20, 2019, European Patent Office, Munich, Germany.

*Primary Examiner* — William R Harp
(74) *Attorney, Agent, or Firm* — Catherine M. Bishop

(57) ABSTRACT

A conveyor includes a powered pop-up roller driven by separable drive components. A first drive component is rigidly coupled to the frame of the conveyor. The first drive component induces motion driving the roller in a second drive component, which is fixed to the roller but separable from the first drive component.

17 Claims, 10 Drawing Sheets

(56) References Cited

U.S. PATENT DOCUMENTS

| | | | | |
|---|---|---|---|---|
| 3,053,368 A * | 9/1962 | Klahn | ............... | B65G 39/12 |
| | | | | 193/35 R |
| 3,252,556 A * | 5/1966 | Isacsson | ............ | B65G 13/11 |
| | | | | 193/35 R |
| 3,888,343 A * | 6/1975 | Snyder | ............... | B65G 13/02 |
| | | | | 193/37 |
| 5,749,454 A | 5/1998 | Layne | | |
| 5,957,265 A * | 9/1999 | Clopton | ............ | B65G 47/66 |
| | | | | 193/35 R |
| 5,971,129 A * | 10/1999 | Stawniak | ............ | B66B 29/08 |
| | | | | 198/324 |
| 6,158,574 A * | 12/2000 | Williams | ........... | B65G 13/073 |
| | | | | 198/780 |
| 6,575,286 B1 | 6/2003 | Mills | | |
| 8,210,341 B2 * | 7/2012 | Marshall | ............ | B65G 47/66 |
| | | | | 198/600 |
| 8,757,364 B2 * | 6/2014 | Obst | ................. | C23C 14/562 |
| | | | | 193/37 |
| 9,452,896 B2 * | 9/2016 | Lee | ................. | B65G 47/66 |
| 9,688,473 B2 * | 6/2017 | Reed | ................ | B65G 13/073 |
| 10,118,769 B2 * | 11/2018 | Reed | ................ | B65G 13/073 |
| 2004/0035684 A1 | 2/2004 | Fukuoka | | |
| 2008/0223693 A1 * | 9/2008 | Haberkorn | ........... | C23C 14/56 |
| | | | | 198/619 |

* cited by examiner

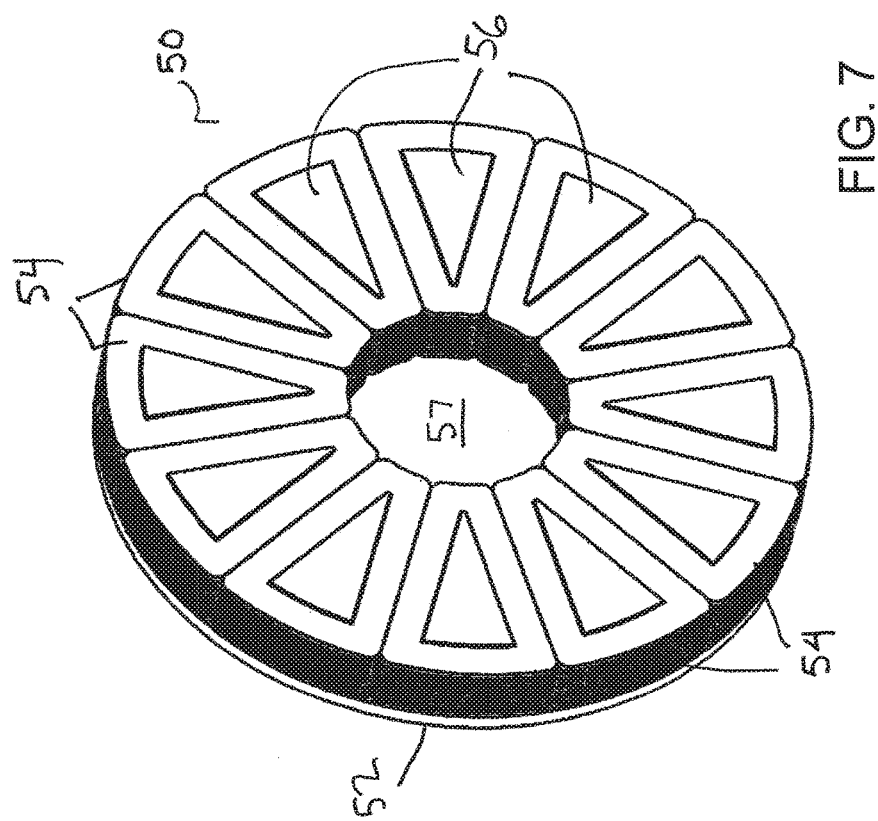

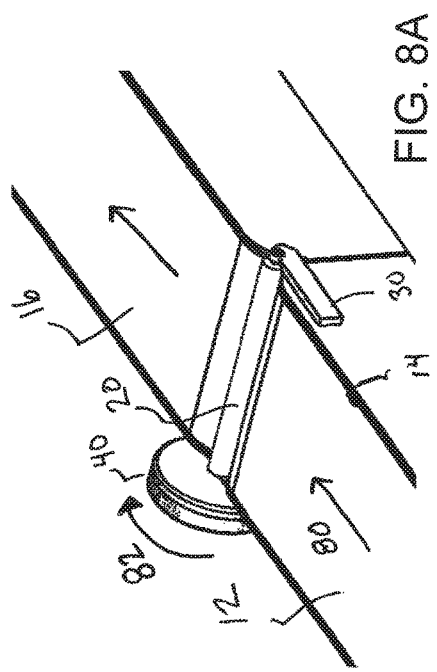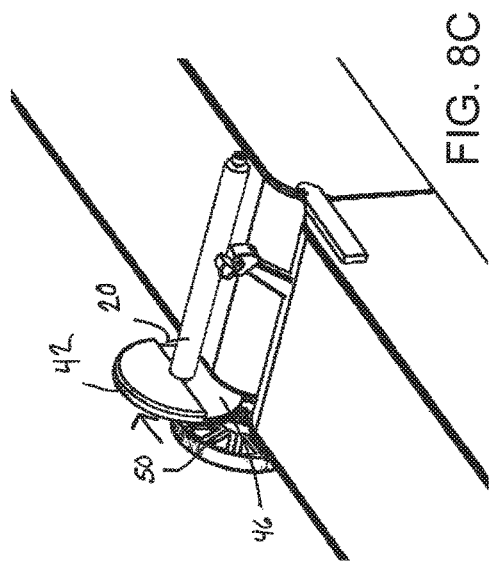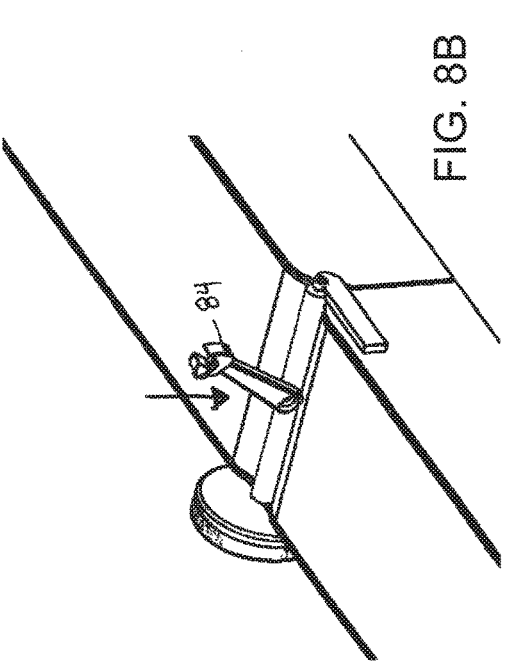

CONVEYOR WITH POWERED POP-UP ROLLER

RELATED APPLICATIONS

This application claims priority to U.S. Provisional Patent Application Ser. No. 62/252,667 filed Nov. 9, 2015 and entitled "Conveyor with Powered Pop-Up Roller", the contents of which are herein incorporated by reference.

BACKGROUND

The invention relates generally to power-driven conveyors and more particularly to conveyors that use powered rollers to convey articles.

Conveyor belts are used to move articles, packages, food items, machine parts, and the like from one locale to another, such as within a factory, plant, manufacturing facility or the like. In some cases, it is necessary to transfer a package, article, or other item from one conveyor belt to a discharge point or from one conveyor belt to another conveyor belt.

Many conveyor applications use rollers to move items. The conveying surface of a conveyor may be formed of rollers, or a transfer roller may be disposed adjacent to an infeed, outfeed or side of a conveyor belt to facilitate transfers. In many applications, a conveyor may include free-spinning idle rollers, for example, in a gravity-driven roller conveyor. In other cases, a conveyor may include a powered roller that is actively driven. For example, a self-clearing roller transfer between two conveyor belts may be used to facilitate transfer from one conveyor belt to another.

However, rollers may present potential jam points that can lead to injury or damage to the conveyed product and-or conveyor equipment.

SUMMARY

A conveyor embodying features of the invention comprises a powered roller that can pop-up separately from the drive mechanism driving the roller. The drive mechanism comprises separable components: a first component rigidly connected to the frame of the conveyor and a second component that is detachable from the first component and connected to the roller. The first component induces rotation in the second component to drive the roller when assembled, but can pop off in the case of jams.

According to one aspect, a conveying system comprises a frame, a roller and a driver for the roller. The driver comprises a first portion fixed to the frame and a second portion fixed to the roller. The second portion is detachable from the first portion.

According to another aspect, a conveying system comprises a frame, a roller support having an open seat fixed to a first side of the frame, a stator fixed to a second side of the frame and housed in a stator housing and a roller assembly comprising a roller, a bearing mounted to an axle extending from a first end of the roller and configured to be received in the open seat, a rotor housing and a disc-shaped rotor connected to a second end of the roller.

A roller assembly for a conveying system, comprising a roller body, a first axle extending from a first side of the roller body, a second axle extending from a second side of the roller body, a bearing mounted on the first axle and a disc-shaped rotor mounted to the second axle.

According to still another aspect, an axial flux motor is provided. The axial flux motor comprises a stator housing for housing a stator assembly, a rotor housing, a stator housed in the stator housing and a disc-shaped rotor. The stator housing comprises an end plate, an outer ring extending forward from a circumferential edge of the end plate and a lower semi-annular protrusion extending forward from the outer ring to form a ledge. The rotor housing comprises a semi-annular outer ring and a front face extending radially inwards from a circumferential edge of the semi-annular outer ring, the front face forming a bottom edge that rests on the ledge. The rotor extends from the semi-annular outer ring opposite the front face, the disc-shaped rotor faces and is spaced from the stator when the rotor housing mates with the stator housing.

BRIEF DESCRIPTION OF THE DRAWINGS

FIG. 7 is an isometric view of an axial flux stator suitable for use in the conveyor of FIG. 1;

FIG. 8A shows the conveyor of FIG. 1 during operation;

FIG. 8B shows the conveyor of FIG. 8B during a jam;

FIG. 8C shows the conveyor of FIG. 8C during detachment and ejection of the powered roller following the jam;

DETAILED DESCRIPTION

A powered roller in a conveyor for safely conveying products is easily displaced when a foreign object gets jammed between the roller and an adjacent roller or conveyor belt. This provides added safety and a reduction in consequent damage to personnel, product and equipment. The invention will be described relative to certain illustrative embodiments, though the invention is not limited to those embodiments illustrated.

Figure 1:
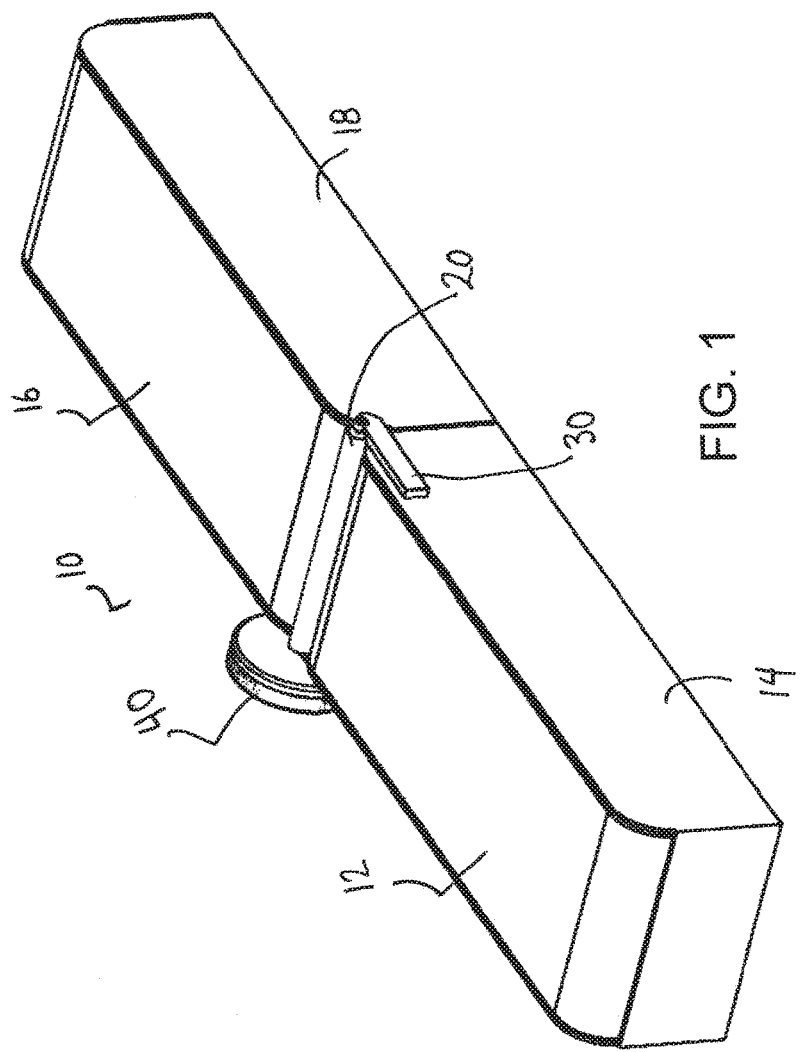
FIG. 1 is an isometric view of a conveyor including a powered pop-up roller according to an embodiment of the invention.
Figure 2:
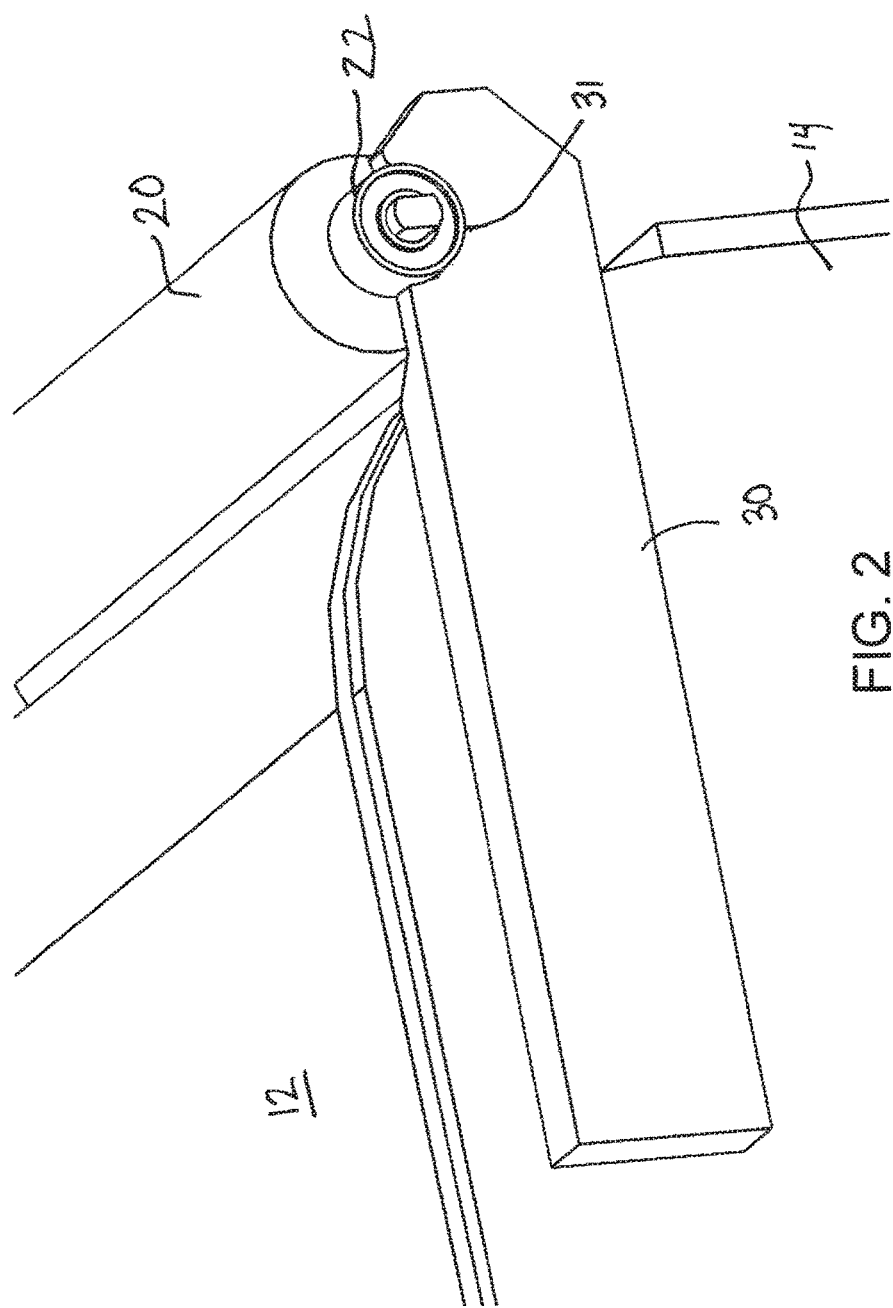
FIG. 2 a detailed view of the conveyor of FIG. 1 showing the roller support opposite the drive side.

A conveyor embodying features of the invention is shown in FIG. 1. The illustrative conveyor 10 comprises a first conveyor belt 12 trained around reversing elements on a frame 14 to form a first conveying surface and a second conveyor belt 16 trained around reversing elements on a frame 18 to form a second conveying surface. Frames 14 and 18 may be unitary or separate structures. A transfer roller 20 is disposed between the outfeed of the first conveyor belt 12 and the infeed of the second conveyor belt 16 to facilitate transfer of product from the first conveyor belt 12 to the second conveyor belt 16. The roller 20 is designed to pop up in the event of a jam. As shown, the pop-up roller 20 is only partially supported, mostly underneath and side-to-side so that the roller 20 can be easily displaced from the supports in the event of a jam. As shown in FIG. 2, the illustrative roller support 30 comprise an open seat 31 in a front end for receiving a bearing 22 extending from a first side of the roller 20. The front end of the roller support 30 is thinner than the back end to accommodate the roller 20. The roller support 30 supports the roller 20 from the bottom by supporting the bearing 22 from below, allowing gravity to hold the roller assembly in place. The roller support 30 also prevents lateral movement of the roller 20.

A driver 40 for the roller is disposed on the second side of the conveyor. At least a portion of the driver 40 can be separated from the roller to enable detachment of the roller in the event of a jam. In the illustrative embodiment, the driver 40 comprises a single-sided axial flux induction motor having components that can separate from each other. The illustrative axial flux induction motor has a fixed stator and a separable rotor component. The axial flux motor has a housing with at least two parts that mate to assemble the axial flux motor. A first housing component houses a stator assembly and is fixed to the conveyor frame and a second housing component houses a rotor assembly and is detachable from the conveyor frame.

Figure 3:
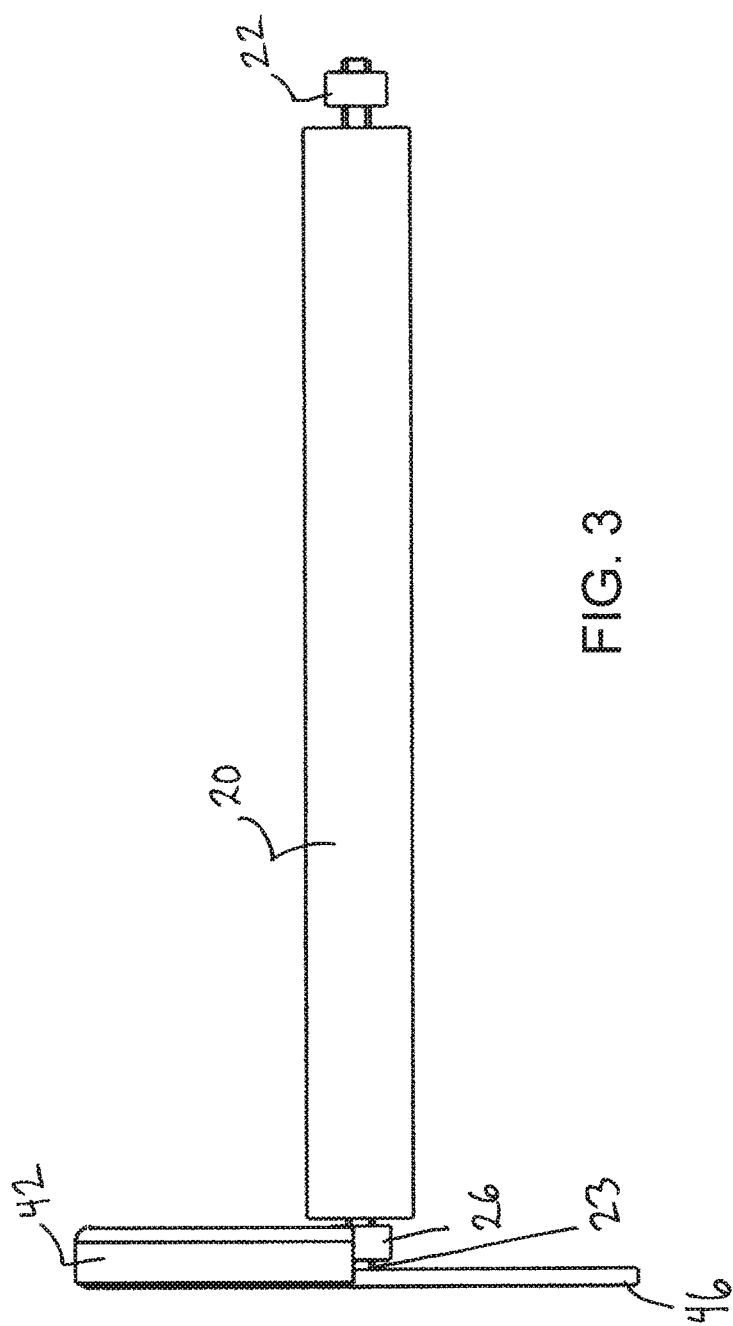
FIG. 3 is a front plan view of a roller assembly according to an embodiment of the invention.
Figure 4:
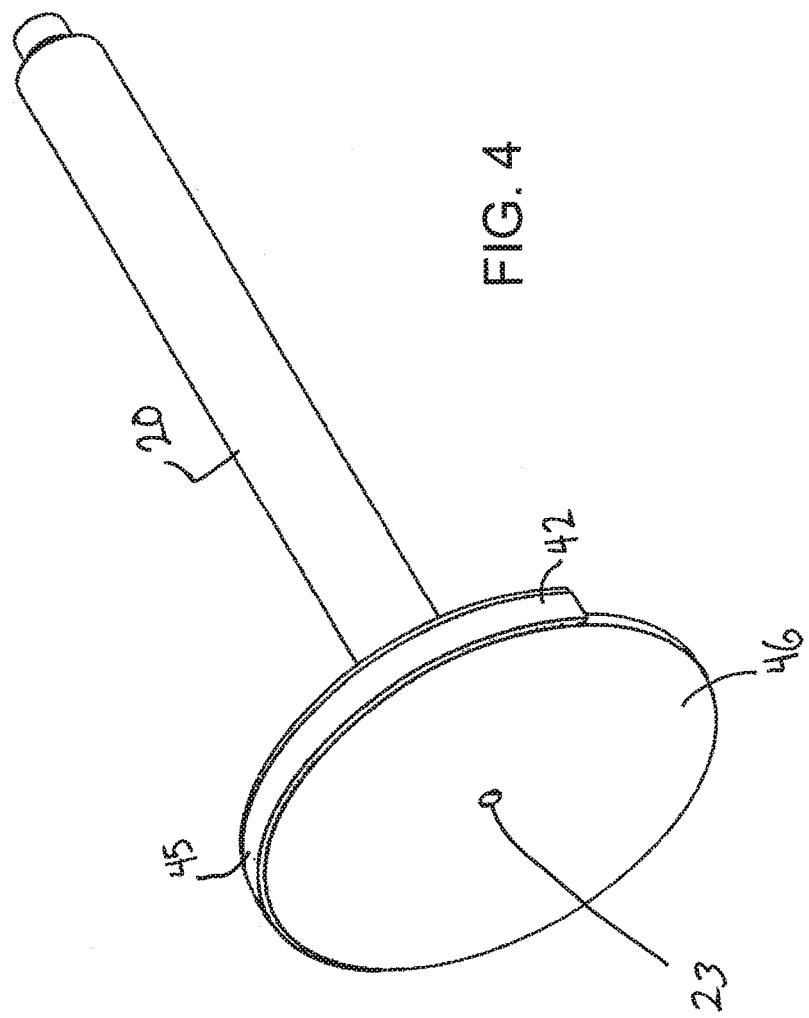
FIG. 4 is an isometric view of the roller assembly of FIG. 3.
Figure 5:
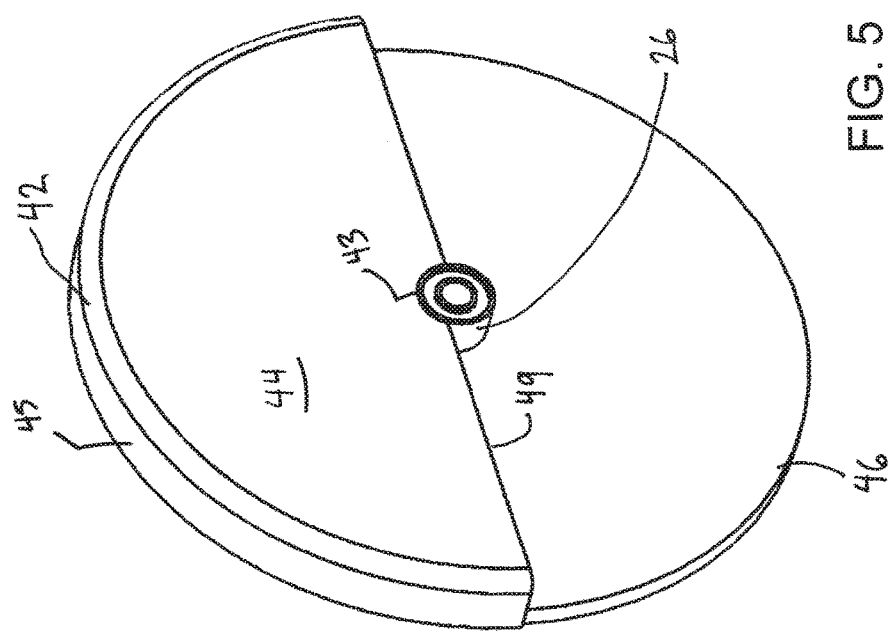
FIG. 5 is an isometric view of a portion of the roller assembly of FIG. 3.

Referring to FIGS. 3-5, the second side of the roller 20 includes a second bearing 26 attached to a rotor guard 42. The rotor guard 42 includes a front face 44 that is substantially semi-circular and an outer ring 45 extending in from the circumferential edge of the front face 44. The front face 44 includes a recess 43 in the bottom edge 49 for receiving the second bearing 26 of the roller 20. The drive guard 42 houses a rotor 46 for the axial flux motor, which extends from the back circumferential edge of the outer ring 45. An axle 23 from the roller 20 extends into the center of the rotor 46 to connect the roller to the rotor so that rotation of the rotor 46 imparts rotation of the roller 20. The illustrative rotor 46 comprises a disc made of an electrically conductive material, such as aluminum or copper and lacks back iron to prevent an attractive force between the stator and rotor while the motor is powered, though the invention is not so limited.

Figure 6:
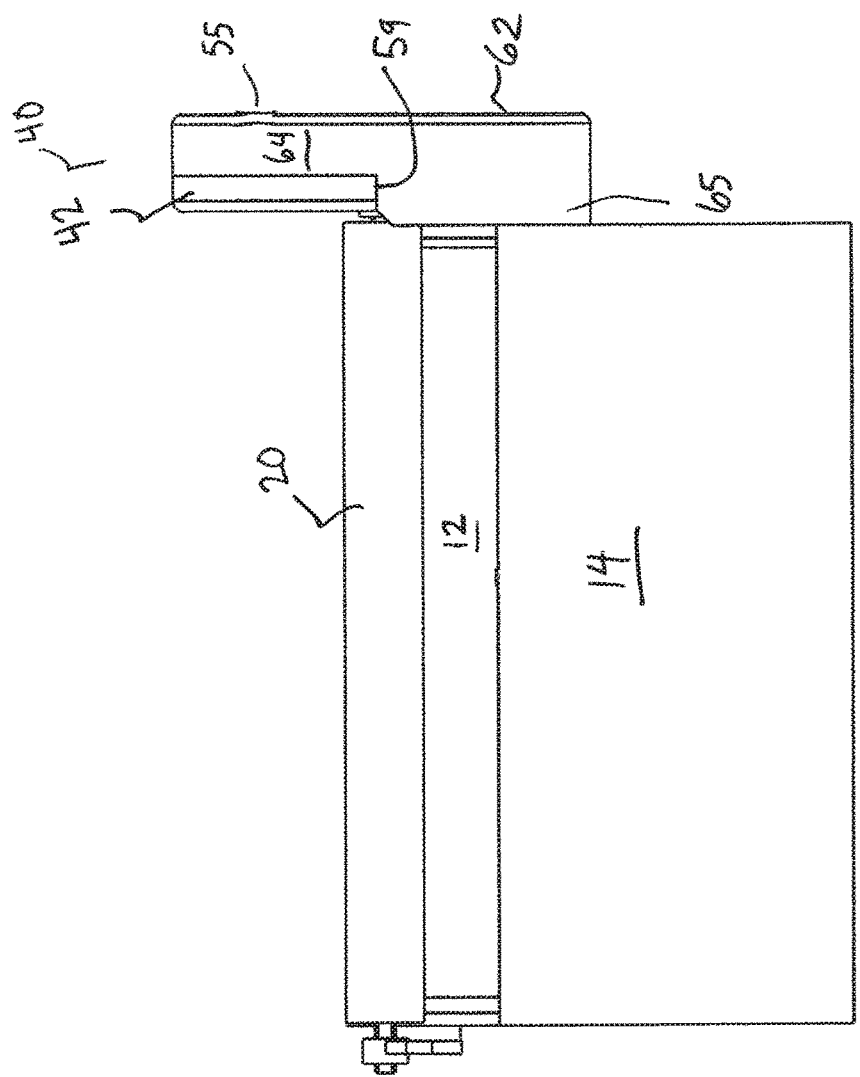
FIG. 6 is a front plan view of a conveyor discharge end showing the frame-mounted powered pop-up roller in position.

As shown in FIG. 6, a stator portion of a driver 40 is attached to the conveyor frame 14 while a detachable portion of driver 40 drives the roller 20. The stator assembly is housed in a stator guard 55 and fixedly mounted to the conveyor frame 14 and-or 16. The roller assembly, including the roller 20, attached rotor guard 42 and rotatable rotor 46, mates with the stator guard 55, with the bottom edge 49 of the rotor guard 46 resting on or otherwise mating with a ledge 59 on the stator guard 55, as shown in FIG. 6, to place the rotor 46 in operable position relative to the stator assembly housed in the stator guard.

FIG. 7 shows an embodiment of a three-phase axial flux stator 50 suitable for producing magnetic flux in the illustrative driver 40. The stator 50 includes a magnetic return plate 52 and a plurality of radially disposed copper windings 54 over laminated triangular or wedge-shaped steel cores 56 radially distributed about a central opening 57. The stator 50 is not limited to the illustrative embodiment and can comprise any arrangement of components suitable for producing a magnetic flux in the direction of the roller axis.

Referring back to FIG. 6, the stator 50 of FIG. 7 is housed in the stator housing 55, which includes an end plate 62, an outer ring 64 extending forward from the circumferential edge of the end plate to form a cylindrical housing and a lower semi-annular extension 65 of the outer ring 64 forming the ledge 59 for receiving the rotor guard 42.

When assembled, as shown in FIG. 6, the rotor guard 42 rests on or otherwise mates with the ledge 59 of the stator housing. The bearing outer surfaces support and locate the roller 20 while the bearing on the rotor side is attached to the rotor guard 42. The rotor guard 42 is supported by both the bearing 26 and by the stator guard 55, which is fixed in place relative to the frame, to place the attached roller 20 in proper position relative to the conveyor belts 14 and 16. When energized with three phase currents, the stator 50 produces a traveling magnetic flux rotating along a cylindrical path about the axis of the roller and directed normal to the face of the conductive rotor 46. The rotating magnetic field from the stator 50 induces currents in the rotor 46 which produces reaction magnetic fields that impart a torque and rotate the roller 20 at a selected speed and in a selected direction.

When assembled, the axial flux motor 40 has no attractive force between the stator 50 and the rotor 46. Rather, there are only torsional forces rotating the disc and repulsive forces resulting from the induced reaction field.

This characteristic allows the rotor 46 and stator 50 to operate without a mechanical connection. The powered roller can be therefore driven by an axial flux motor stator 50 fixedly mounted to a conveyor frame with the rotor 46 driving a pop-up roller supported only from below and constrained side to side so that the roller and rotor assembly can be ejected from the support carriage should a foreign object be injected between the roller and an adjacent roller or conveyor belt.

The pop-up roller and rotor sub-assembly could be quickly and easily replaced once the jam situation has been remedied.

FIGS. 8A-8C show the operation of the powered pop-up roller 20 according to an embodiment of the invention. An infeed conveyor 12 moves product in direction 80, while the axial force motor 40 rotates the roller 20 in direction 82 to pass product to the discharge conveyor 16. The roller 20 is supported underneath and side-to-side during normal operation and rotates without interference. However, if a tool 84 or other object jams the roller 20, as shown in FIG. 8B, the roller assembly is free to escape the support structure. As shown in FIG. 8C, in the event of a jam, the stator field from the stator 50 repels the rotor 46 so it can be easily displaced and ejects the attached roller 20. The freed roller stops rotating after ejection. The roller assembly can be quickly replaced after resolution of the jam to return the conveyor to operation.

Figure 9:
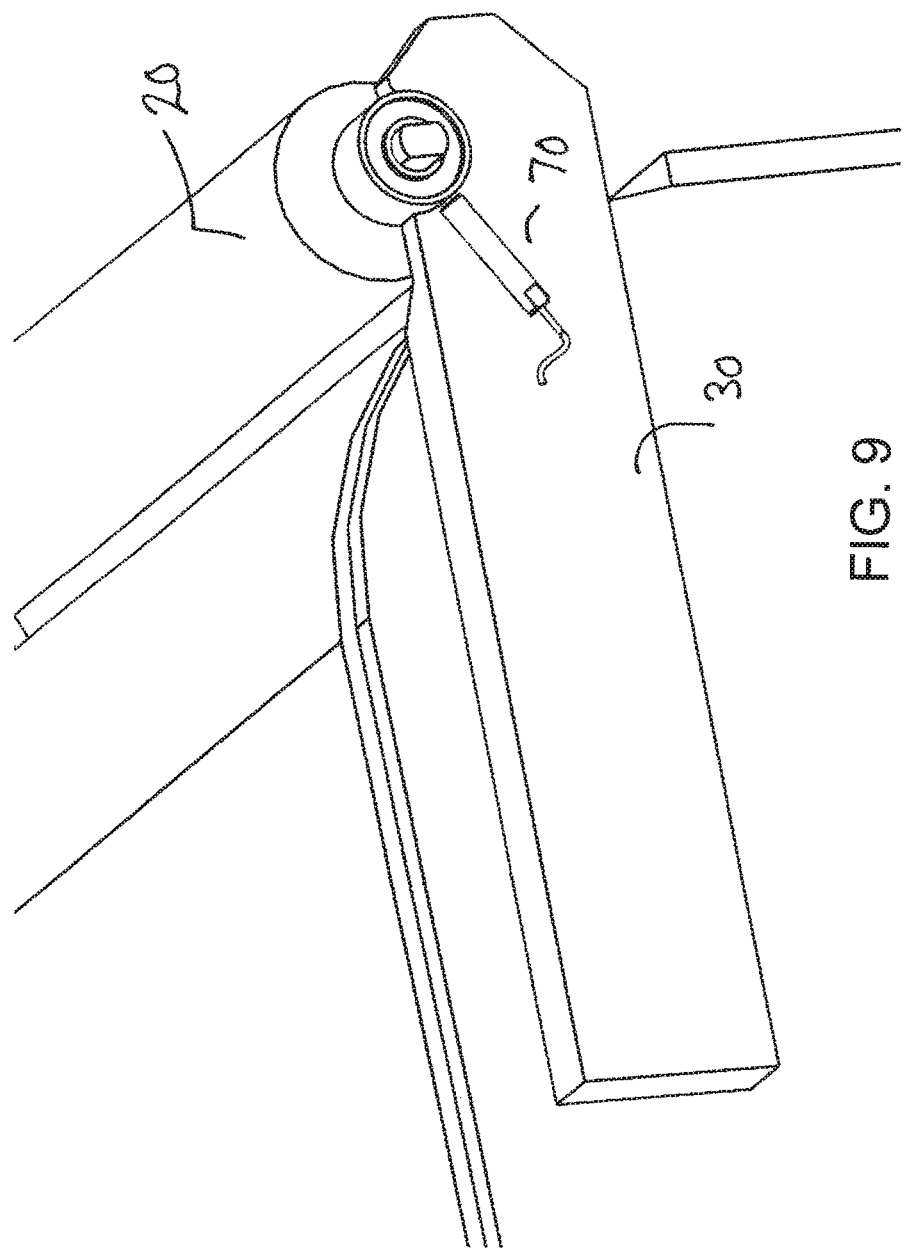
FIG. 9 is an isometric view of a conveyor including a powered pop-up roller and a proximity sensor according to another embodiment of the invention.

In another embodiment, shown in FIG. 9, the conveyor includes a proximity sensor 70 for detecting when the roller 20 has been ejected. The proximity sensor 70 sends a signal to a control system, alerting that a hazard has occurred so that the conveyor system can be shut down in a safe and orderly fashion.

Figure 10:
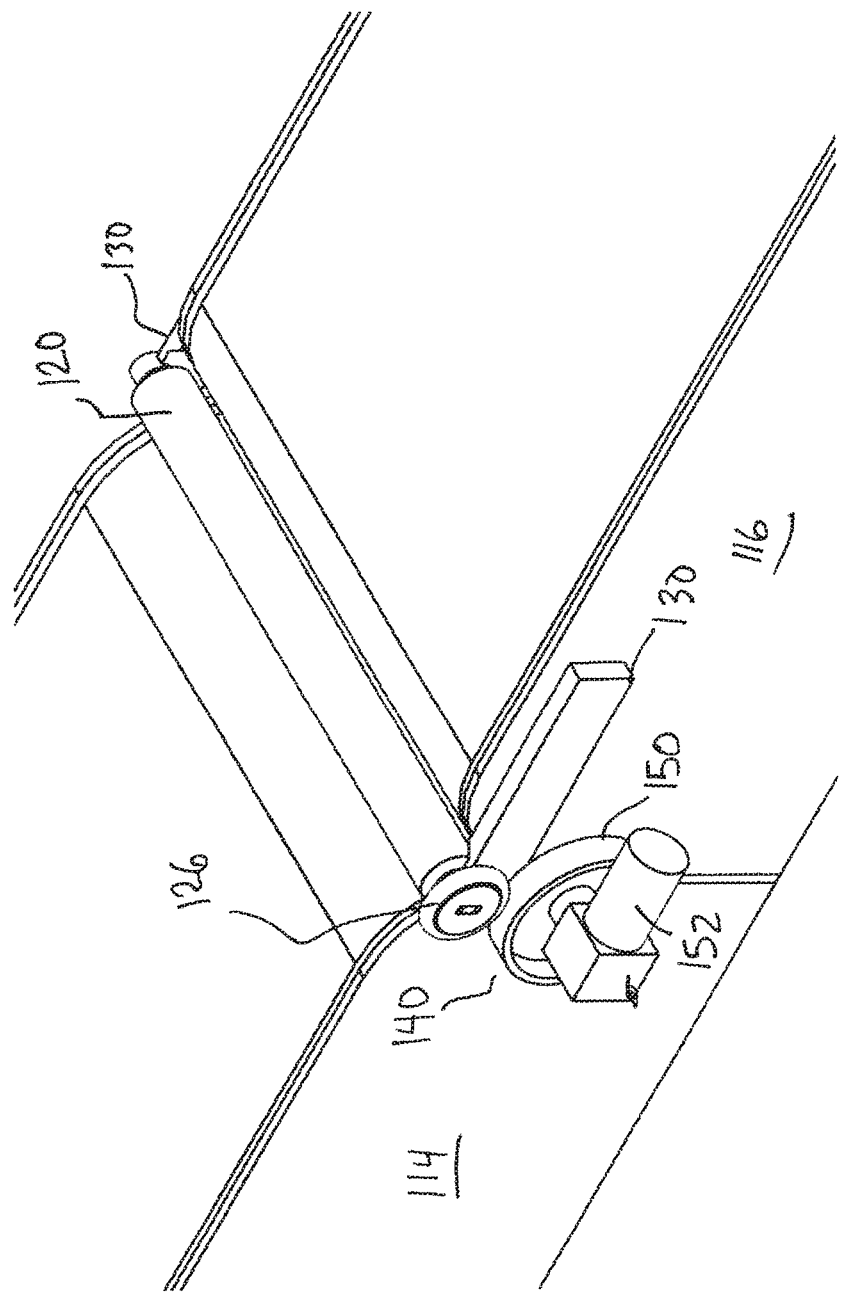
FIG. 10 is an isometric view of a conveyor including a powered pop-up roller powered by a drive wheel according to another embodiment of the invention.

FIG. 10 shows another embodiment of a powered pop-up roller in a conveying system. In FIG. 10, the driver 140 for the roller 120 also comprises a fixed portion and a detachable portion. The illustrative fixed portion is a friction drive wheel 150 that is driven by a conventional gear motor 152 attached to the conveyor frame 114 and-or 116. The roller 120 includes an end wheel 126 attached to an axle stem extending from a side of the roller. The end wheel 126 contacts the drive wheel 150. Rotation of the drive wheel induces rotation of the end wheel, causing the roller 120 to rotate. As shown, the roller 120 axles rest in a roller support 130 having an open seat to allow the roller to pop up if a jam occurs. Other means for driving the pop-up roller may be used.

The use of a fixed portion and a detachable portion for driving a roller in a conveyor system provides significant advantages, such as improved safety and limited down-time during jams. The illustrative embodiments have a relatively simple construction, are light-weight, easily replaced and low maintenance with minimal moving parts.

So, as these few examples suggest, the scope of the claims is not meant to be limited by the details of the exemplary versions.

What is claimed is:

1. A conveying system comprising:
a frame;
a roller;
a driver for the roller comprising an axial flux motor, the driver comprising a first portion fixed to the frame and a second portion fixed to the roller, wherein the second portion is detachable from the first portion.

2. The conveying system of claim 1, wherein the axial flux motor comprises a stator housed in a stator housing fixed to the frame and a rotor housed in a rotor housing coupled to the stator housing, the rotor fixed to an end of the roller.

3. The conveying system of claim 2, wherein the rotor is a disc formed of a conductive material.

4. The conveying system of claim 2, wherein the stator comprises a magnetic return plate and a plurality of copper windings over laminated steel cores.

5. The conveying system of claim 4, wherein the stator housing includes a ledge, and the rotor housing includes a bottom edge configured to mate with the ledge when the axial flux motor is assembled.

6. The conveying system of claim 1, wherein the driver comprises a drive wheel fixed to the frame and an end wheel connected to an axle nub of the roller and in contact with the drive wheel.

7. The conveying system of claim 1, wherein the roller includes a bearing and the frame includes a roller support having an open seat for receiving the bearing.

8. The conveying system of claim 1, further comprising a sensor for sensing when a roller has detached from the frame.

9. A conveying system comprising:
a frame;
a roller support having an open seat fixed to a first side of the frame;
a stator fixed to a second side of the frame and housed in a stator housing; and
a roller assembly comprising a roller, a bearing mounted to an axle extending from a first end of the roller and configured to be received in the open seat, a rotor housing and a disc-shaped rotor connected to a second end of the roller.

10. The conveying system of claim 9, wherein the stator housing comprises an end plate, an outer ring and a lower protrusion from the outer ring forming a ledge and the rotor housing comprises a semi-circular front face having a bottom edge that mates with the ledge.

11. A roller assembly for a conveying system, comprising:
a roller body;
a first axle extending from a first side of the roller body;
a second axle extending from a second side of the roller body;
a bearing mounted on the first axle; and
a disc-shaped rotor mounted to the second axle.

12. The roller assembly of claim 11, further comprising a rotor housing comprises an outer ring receiving the disc-shaped rotor on a first circumferential edge and a semi-circular front face having a bottom edge extending from a second circumferential edge of the outer ring.

13. The roller assembly of claim 12, wherein the front face includes a recess for receiving a bearing mounted to the second axle.

14. An axial flux motor, comprising:
a stator housing for housing a stator assembly, the stator housing comprising an end plate, an outer ring extending forward from a circumferential edge of the end plate and a lower semi-annular protrusion extending forward from the outer ring to form a ledge;
a rotor housing comprising a semi-annular outer ring and a front face extending radially inwards from a circumferential edge of the semi-annular outer ring, the front face forming a bottom edge that rests on the ledge;
a stator housed in the stator housing; and
a disc-shaped rotor extending from the semi-annular outer ring opposite the front face, the disc-shaped rotor facing and spaced from the stator when the rotor housing mates with the stator housing.

15. The axial flux motor of claim 14, further comprising:
a roller coupled to the disc-shaped rotor.

16. A conveying system comprising:
a frame;
a roller;
a driver for the roller, the driver comprising a first portion fixed to the frame and a second portion fixed to the roller, wherein the second portion is detachable from the first portion; and
a sensor for sensing when the roller has detached from the frame.

17. The conveying system of claim 16, wherein the driver comprises an axial flux motor.

* * * * *